United States Patent [19]

Niles

[11] 4,356,091
[45] Oct. 26, 1982

[54] FILTERING AND DAMPENING APPARATUS

[75] Inventor: Albert B. Niles, Peoria, Ill.

[73] Assignee: Caterpillar Tractor Co., Peoria, Ill.

[21] Appl. No.: 261,093

[22] Filed: Oct. 6, 1980

[51] Int. Cl.³ .......................................... B01D 35/02
[52] U.S. Cl. ............................... 210/354; 210/416.4; 239/533.3
[58] Field of Search ............. 210/136, 354, 389, 390, 210/398, 416.4, 446; 239/533.3

[56] References Cited

U.S. PATENT DOCUMENTS

| | | | |
|---|---|---|---|
| 2,486,133 | 10/1949 | Egger | 138/41 |
| 3,275,145 | 9/1966 | Jacobellis | 210/390 X |
| 3,327,858 | 6/1967 | Eddy et al. | 210/234 |
| 3,655,059 | 4/1972 | Johnson | 210/446 |
| 3,890,232 | 6/1975 | Combest et al. | 210/223 |
| 3,986,795 | 10/1976 | Krane et al. | 417/296 |
| 4,111,370 | 9/1978 | Chelgren | 239/533.3 |

Primary Examiner—Thomas G. Wyse
Attorney, Agent, or Firm—William B. Heming

[57] ABSTRACT

High pressure fluid systems, such as fuel injection systems for an engine or hydraulic controls, often experience high pressure fluctuations which can cause cavitation in the system components plus secondary fuel injection in the fuel systems. Apparatus (10) is provided for dampening the pressures in such systems, as well as filtering the fluid. The apparatus (10) has a filtering element (36) which does not substantially restrict fluid flow but is movable in response to pressure waves in the fluid which are directed onto the filtering element (36). The filtering element (36) thereby filters the fluid and tends to dampen the effects of the pressure waves, which create the pressure fluctuations, by resisting their movement through the fluid system.

6 Claims, 1 Drawing Figure

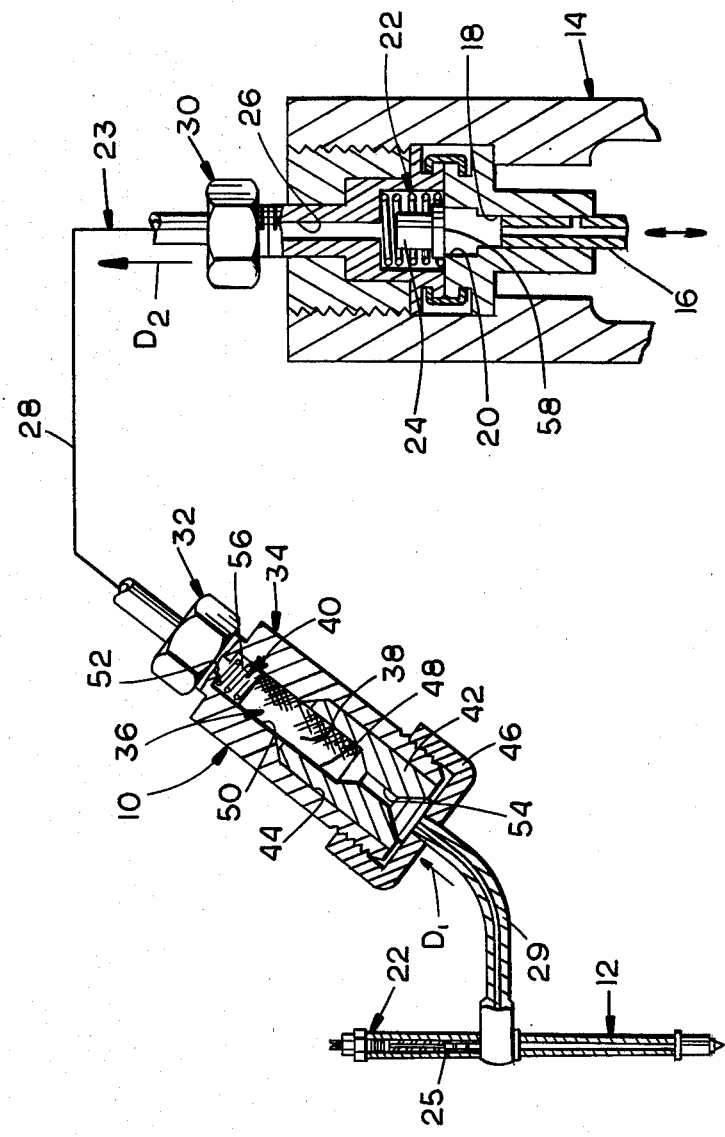

FILTERING AND DAMPENING APPARATUS

DESCRIPTION

1. Technical Field

The present invention relates to fluid pressure systems, such as engine fuel injection systems, and, more particularly, to filtering and pressure dampening apparatus in such systems.

2. Background Art

In high pressure fluid systems, cavitation can be a serious problem in that the fluid pressure can frequently drop below the vapor pressure of the fluid owing to large pressure fluctuations in such systems.

For example, diesel engines employ fuel injection systems which have a high pressure fuel injection pump for each combustion cylinder of the engine to provide pressurized fuel at specific intervals to an associated nozzle for injection into the related combustion cylinder. Such systems must have a rather sharp fuel cutoff at the nozzle in order to avoid continued dribbling of fuel into a combustion cylinder which can cause poor combustion and waste of fuel. This is particularly critical to meet emissions standards for engines.

When high injection pressures and high engine speeds are used, a sharp cutoff can cause large pressure fluctuations in the fuel line between the fuel pump and nozzle. The fluctuations result largely from secondary pressure waves which develop in the lines as the nozzle cuts off fuel flow into the cylinder. The high pressures at the nozzle, when it abruptly cuts off the flow, create shock or pressure waves which travel back toward the pump to introduce the fluctuations leading to cavitation or, under some circumstances, secondary fuel injection into a combustion cylinder.

It is desirable, therefore, to dampen such secondary pressures to decrease their effect in the system. One solution has been to use a labryinth of restricted passages to dampen pressure while permitting fluid flow. The restrictions can, however, be too great for high speed engine operation. Another solution, shown in U.S. Pat. No. 3,986,795, which issued to Kranc et al on Oct. 19, 1976, is to provide a reverse check valve at the injection pump to control the secondary pressures.

The present invention is directed to overcoming one or more of the problems set forth above.

DISCLOSURE OF INVENTION

In one aspect of the present invention, apparatus for filtering fluid and dampening the pressure of said fluid includes a housing and a filtering element. The housing has a chamber in which a filtering element is positioned. The filtering element is movable in the chamber between first and second positions in response to a pressure wave of fluid directed onto and through the filtering element.

The filtering and dampening apparatus is used for example, in fuel injection systems for engines. The apparatus filters fluid pressurized by a pump and directed through a nozzle for injection into a combustion cylinder of the engine. The filter is also movable to absorb or dampen pressure waves created in the system owing to sudden cutoff of the pressurized fuel being injected. This reduces large fluctuations in fuel pressure to substantially eliminate cavitation and secondary injection into the combustion cylinder.

BRIEF DESCRIPTION OF THE DRAWINGS

The drawing is a diagrammatic cross-sectional view in partial elevation of one embodiment of the present invention associated with a pump and nozzle of a fuel injection system for an engine.

BEST MODE FOR CARRYING OUT THE INVENTION

Referring to the drawing, apparatus 10 for filtering fluid and dampening pressure of fluid is shown associated with, for example, a fuel injection nozzle 12 for a combustion cylinder of a diesel engine (not shown). As is known in the fuel systems art, the nozzle is operable to inject fluid or fuel into the combustion cylinder when supplied from a pressurized fluid source 14, such as a fuel injection pump. The pump has a plunger 16 which is movable upwardly in a bore 18 opening on a chamber 20. Valve means 22 is provided to initiate or control flow of fuel into a fluid pathway 23 to the nozzle at a fluid pressure of a desired magnitude, such as by a first spring biased check valve 24, and to block flow of fluid from the fluid pathway, such as by a second spring biased check valve 25. The fluid pathway includes a passageway 26 at the pump, and first and second fluid or fuel lines 28,29. The first fuel line 28 extends between a fuel line coupler 30,32 of the pump and of the filtering and dampening apparatus. The second fuel line 29 extends from said apparatus to the nozzle. It should be understood that the filtering and dampening apparatus can also be positioned at other locations in the fuel system.

Referring to the filtering and dampening apparatus 10 in detail, said apparatus has a housing 34 and a filtering element 36. The filtering element is preferably a woven, knitted or compressed wire filter, or a sintered screen filter as shown by reference numeral 38, with a preselected porosity for filtering fluid to the degree desired as it passes through the filter. The porosity is preferably such that the filter traps particles which might otherwise plug the jet orifices of the fuel injection nozzle 12 through which fuel enters a combustion cylinder. The housing has a chamber 40 in which the filter is movably positioned and a retainer 42 which is removably positioned in an opening 44 of the housing. The retainer is maintained in position by the second fuel line 29 which abuts said retainer and urges it against the housing when a fuel line connector element 46 is threadably tightened on the housing. In the embodiment shown, the chamber is thus defined by a cylindrical bore 48 in the retainer with a cylindrical bore 50 in said housing. Said chamber is a portion of the fluid pathway in that it is positioned in fluid communication with the first and second fuel lines 28,29 through passageways 52,54 in the housing.

The filter 38 is movable in the chamber 40 between first and second positions in response to a pressure wave of the fuel in the fluid pathway 23 which is directed onto and through the filter. The first position (shown) is represented by the furthermost travel of the filter in the retainer bore 48 at which it abuts the retainer 42. The second position is represented by the furthermost travel of the filter in the housing bore 50. A spring 56 is shown which continuously biases the filter from its second toward its first position. Although not shown, it may be necessary to use a retaining element between the spring and the filter to properly align the filter and spring and to protect the filter. The spring can also be omitted by properly sizing the filter with respect to the diameters of the bores 48,50 in order to obtain resistance to travel of the spring in the chamber bores 48,50 through friction between the walls of the chamber bores and the filter. The diametrical clearance in such embodiments is preferably such that particles which might otherwise plug the jet orifices of the nozzle 12 are blocked from passing between the walls of the chamber 40 and the filter.

As is evident from the drawing, the filter 38 is movable from the first toward the second position in response to the pressure wave of the fuel being oriented in a first direction $D_1$ in the fluid pathway. Such pressure wave orientation is opposite the orientation of the pressure wave caused by fuel compressed by the pump 14 which travels in a second direction $D_2$ through the fluid pathway 23. The filter is movable from its second toward its first position by the return action of the spring 56 or, where the spring is absent, by the pressure wave being oriented in said second direction and having a fluid pressure at about a first preselected magnitude. The first preselected magnitude herein represents the injection pressure of fuel at which the nozzle 12 is operable to introduce fuel into the combustion cylinder of the engine.

It should be understood that the filter 38 and housing 34, as well as the other fluid system components with which they are used, can be of other configurations as is known in the art without departing from the invention.

Industrial Applicability

In the operation of the fuel injection system, the plunger 16 moves upwardly in the bore 18 on the injection cycle of the associated engine to compress pressurized fuel trapped in the chamber 20. The fuel is forced upwardly by the plunger against a face 58 of the check valve 24 and forces the valve to its open position at which fuel flow at the fluid injection pressure of about the first preselected magnitude is initiated in the fuel lines 28,29 to the nozzle 12. At such pressure, the check valve 25 in the nozzle 12 will open and fuel is injected into the related one of the engine combustion cylinders (not shown).

When the plunger 16 reaches the end of its stroke, the pump 14 is blocked from initiating fuel flow and fuel pumping ends. The check valve 24 at the pump 14 moves to its closed position owing to the spring bias and to higher fuel pressure on the top of the valve. The force made by the pressure of the fuel then becomes less and the check valve 25 in the nozzle 12 abruptly closes and stops injection into the combustion cylinder.

A pressure is developed in response to closure of the nozzle check valve 25 and the abrupt termination of the injection cycle. Such pressure is a shock or pressure wave resulting from the check valve closing in the nozzle 12, where said check valve has blocked further injection. The pressure wave travels back toward the pump 14 and subsequently reflects or bounces off of the closed pump check valve 24 which tends to reverse direction of said wave. The pressure wave then travels in the fuel lines 28,29 until said wave reaches the closed valve 25 where it is again reflected. Such pressure phenomenon is generally referred to as secondary pressure waves and can result in undesirable cavitation owing to a combination of reversals of the secondary pressure waves at certain points in the fuel lines 28,29 which generates a vacuum condition. Further, when the reflected magnitude of a pressure wave is greater than the preselected opening pressure of the check valve 25, an undesirable fuel injection into a combustion cylinder will occur. The filter 38, being positioned in the fluid flow path, acts to dampen or flatten out the secondary pressure waves to substantially reduce their magnitude and such detrimental effects as may occur in the fuel system.

For example, in embodiments utilizing the spring 56, when the pump 14 initiates the injection flow, the filter 38 is at its first position (shown) owing to the action of the spring. In embodiments where the spring is absent, the filter is movable to the first position in response to the fluid flow at the injection pressure. Such movement will generally be substantially unresisted by the frictional forces between the filter and bores 48,50 owing to the high injection pressures relative to the secondary pressures. Thus, dampening or reducing injection pressure in moving the filter to its first position should be minimal.

As the secondary pressure waves are created, therefore, the filter 38 is movable from its first position abutting the retainer 42 toward its second position in response to the secondary pressure waves, in effect, striking the filter. The filter, in being moved by the pressure waves as they travel back toward the pump 14 in the first direction $D_1$, tends to dampen their effect in the fuel lines 28,29 by absorbing energy and thus substantially eliminates cavitation and unwanted secondary fuel injections into the combustion cylinder of the engine. Also, for high fuel flow operational requirements of the engine, the filter porosity can be sized to minimize the restrictions to fuel flow while maintaining filtering operation. The combined filter and pressure pulse dampener therefore obviates the need for an additional filter in the system, such as an edge filter which is commonly used in such fuel systems.

Other aspects, objects and advantages will become apparent from a study of the specification, drawings and appended claims.

I claim:

1. Apparatus (10) for filtering fluid and dempening pressure of said fluid, comprising:

first and second fluid lines (28,29);

a housing (34) having a bore (50) and an opening (44) communicating with said bore (50), said bore (50) being in fluid communication with said first fluid line (28) at one end of said bore (50);

a retainer (42) having a bore (48) and being removably positioned in said opening (44), said bore (48) being positioned in fluid communication with said second fluid line (29) and with said bore (50) of said housing (34);

a connector element (46) adjustably positioned on said housing (34) to maintain said retainer (42) in position; and a filtering element (36) having a preselected filtering porosity and being positioned in said bores (50,48) of said housing (34) and retainer (42) to filter the fluid passing through said first fluid line (28) to said second fluid line (29) and controllably movable in said bores (50,48) in response to a pressure wave in the fluid traveling in said second fluid line (29) toward said first fluid line (28) striking said filtering element (36) to dampen said pressure wave.

2. The filtering and dampening apparatus (10), as set forth in claim 1, including a pressurized fluid source (14), a fluid nozzle (12) and valve means (22) for controlling fluid flow from said fluid source (14) into said first fluid line (28) through said filtering element (36)

and second fluid line (29) and from said fluid nozzle (12).

3. The filtering and dampening apparatus (10), as set forth in claim 1, wherein said filtering element (36) is continuously biased toward said first position of said filtering element (36).

4. The filtering and dampening apparatus (10), as set forth in claim 1, wherein said filtering element (36) is a woven wire filter (38).

5. The filtering and dampening apparatus (10), as set forth in claim 1, wherein said filtering element (36) is a sintered screen filter (38).

6. The filtering and dampening apparatus (10), as set forth in claim 1, wherein said filtering element (36) is a compressed wire filter (38).

* * * * *